A. MULLER.
Domestic Boiler.
No. 91,475.  Patented June 15, 1869.
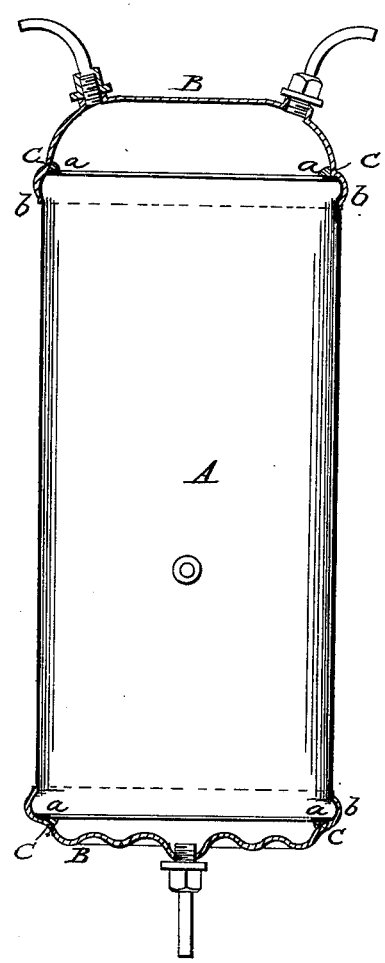

United States Patent Office.

ANTON MÜLLER, OF BROOKLYN, NEW YORK.

Letters Patent No. 91,475, dated June 15, 1869.

IMPROVEMENT IN CONSTRUCTION OF HOT-WATER BOILERS.

The Schedule referred to in these Letters Patent and making part of the same.

To all whom it may concern:

Be it known that I, ANTON MÜLLER, of Brooklyn, in the county of Kings, State of New York, have invented a new and useful Improvement in Hot-Water Boilers; and I do hereby declare the following to be a full, clear, and exact description thereof, which will enable those skilled in the art to make and use the same, reference being had to the accompanying drawing, forming part of this specification, which drawing represents a vertical central section of this invention.

This invention consists in the arrangement of an inwardly-projecting flange and an outwardly-projecting bead at the end, or ends of the body of a hot-water boiler, in combination with a bead at the edge of the head, or heads, to be attached to said body in such a manner, that when the head is sprung over the bead of the body, a recess is formed between the inwardly-projecting flange and the inner surface of the head, which is capable of retaining the solder used in uniting the two parts, said recess producing a large bearing-surface for the solder, thus enabling the same to take a firm hold, and to withstand successfully the influence of the expansions and contractions of the boiler, due to the variable temperature to which the same is subjected.

In the drawing—

The letter A designates the body of a hot-water boiler, such as generally used in dwelling-houses for the purpose of producing a supply of hot water.

To this body are secured two heads, B, one at each end, and, in order to give to the solder used in fastening said heads a firm hold, the body A is provided at each end with an inwardly-projecting flange, a, and with an outwardly-projecting bead, b; and the heads are provided with corresponding beads, so that they can be readily sprung over the beads b, and temporarily fastened in their position by pressing their edges inward, inside of the beads b of the body A.

By means of the flanges a, circular recesses, c, are formed between the outer surfaces of said flanges and the inner surfaces of the heads B, so that by placing the boiler in a horizontal position, introducing solder through the apertures in the heads, heating the boiler and turning it round slowly over a fire, the solder can be readily made to fill up the recesses c, and a firm connection between the heads B and the body A is effected.

The flanges a offer a comparatively large adhesive surface for the solder, and a joint can thus be produced which is not liable to become leaky by the constant expansion and contraction to which the boiler is subjected on account of the varying temperature.

Having thus described my invention,

What I claim as new, and desire to secure by Letters Patent, is—

The arrangement of an inwardly-projecting flange, a, and bead b, at the ends of the body A, in combination with the head B, substantially as shown and described.

This specification signed by me, this 6th day of April, 1869.

ANTON MÜLLER.

Witnesses:
   W. HAUFF,
   O. WAHLERS.